(12) United States Patent
Kawashima

(10) Patent No.: US 10,114,774 B2
(45) Date of Patent: Oct. 30, 2018

(54) DATA TRANSFER METHOD, PARALLEL PROCESSING DEVICE, AND RECORDING MEDIUM

(71) Applicant: FUJITSU LIMITED, Kawasaki-shi, Kanagawa (JP)

(72) Inventor: Takahiro Kawashima, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/691,975

(22) Filed: Aug. 31, 2017

(65) Prior Publication Data

US 2018/0074983 A1 Mar. 15, 2018

(30) Foreign Application Priority Data

Sep. 14, 2016 (JP) ................................ 2016-179556

(51) Int. Cl.
  *G06F 13/28* (2006.01)
  *G06F 12/1081* (2016.01)
  *H04L 29/08* (2006.01)
  *G06F 12/0862* (2016.01)

(52) U.S. Cl.
  CPC .......... *G06F 13/28* (2013.01); *G06F 12/1081* (2013.01); *H04L 67/1097* (2013.01); *G06F 12/0862* (2013.01)

(58) Field of Classification Search
  CPC ... G06F 12/0862; G06F 12/1081; G06F 13/28
  See application file for complete search history.

(56) References Cited

U.S. PATENT DOCUMENTS

| | | | | |
|---|---|---|---|---|
| 7,573,895 B2* | 8/2009 | King | ..................... | G06F 13/387 370/412 |
| 7,917,597 B1* | 3/2011 | Lentini | ............... | H04L 12/6418 370/389 |
| 2004/0015622 A1* | 1/2004 | Avery | ..................... | G06F 13/28 710/22 |
| 2006/0168400 A1* | 7/2006 | Ronciak | .............. | G06F 12/0862 711/118 |
| 2008/0013448 A1* | 1/2008 | Horie | ..................... | G06F 13/105 370/229 |
| 2010/0306421 A1 | 12/2010 | Maeda et al. | | |
| 2011/0173396 A1* | 7/2011 | Sugumar | ............. | G06F 12/0862 711/137 |

(Continued)

FOREIGN PATENT DOCUMENTS

| | | |
|---|---|---|
| JP | 8-328995 | 12/1996 |
| JP | 2009-211248 | 9/2009 |

*Primary Examiner* — Glenn A. Auve
(74) *Attorney, Agent, or Firm* — Staas & Halsey LLP

(57) ABSTRACT

A data transfer method executed by a processor included in a parallel processing device including a first node and a second node, the data transfer method includes transmitting, by a first processor included in the first node, data and information of a size of the data to the second node by remote direct memory access (RDMA); receiving, by a second processor included in the second node, the data and the information of the size of the data from the first node; writing the received data in a memory; and performing prefetch of at least a part of the data, based on information of a position of a memory area of the memory in which the received data has been written and the information of the size of the data.

11 Claims, 12 Drawing Sheets

(56) References Cited

U.S. PATENT DOCUMENTS

2013/0185381 A1* 7/2013 Aho .................. G06F 15/177
709/217
2014/0047058 A1* 2/2014 Trachy ................ G06F 3/0605
709/212

* cited by examiner

FIG. 7

```
footer.data_size              = data_size
order.source_head_addr        = source_head_addr
order.destination_head_addr   = destination_head_addr
order.data_size               = data_size + footer_size
order.embedded_data           = (destination_head_addr + data_size + footer_size - 1) / cache_line_size -
                                (destination_head_addr) / cache_line_size
``` ial No. 2016-179556, filed on Sep. 14, 2016, the entire contents of which are incorporated herein by reference.

FIELD

The embodiment discussed herein is related to a data transfer method, a parallel processing device, and a recording medium.

BACKGROUND

Direct memory access (DMA) is a method in which data is directly transferred between a memory and another device (for example, a peripheral equipment or the like) without going through a central processing unit (CPU). For example, a document describes that data is directly transferred from a cache memory to another cache memory in an information processing device. Another document describes that data is directly transferred from a transfer source area to a transfer destination area in a DMA transfer device.

DMA is a method for data transfer in a single node. On the other hand, a method in which data is directly transferred from a maim memory of a node to a main memory of another node is called remote direct memory access (RDMA).

Data that is transferred by RDMA is written in a main memory of a node that has received the data. In a case where a CPU of the node that has received data uses the data that has been written in the main memory, if there is no data in a cache memory, a cache miss occurs. Due to the occurrence of a cache miss, a time which it takes for the CPU to start processing of the data is increased. In view of this phenomenon, it is desirable to reduce the occurrence of a cache miss at the time of reference to the data that has been transferred by RDMA. For example, Japanese Laid-open Patent Publication No. 8-328995, Japanese Laid-open Patent Publication No. 2009-211248, or the like discusses related art.

SUMMARY

According to an aspect of the invention, a data transfer method executed by a processor included in a parallel processing device including a first node and a second node, the data transfer method includes transmitting, by a first processor included in the first node, data and information of a size of the data to the second node by remote direct memory access (RDMA); receiving, by a second processor included in the second node, the data and the information of the size of the data from the first node; writing the received data in a memory; and performing prefetch of at least a part of the data, based on information of a position of a memory area of the memory in which the received data has been written and the information of the size of the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating a setting example of a footer and a transmission instruction;

DESCRIPTION OF EMBODIMENT

As described above, there is a case where, in a node that has received data that is transmitted by RDMA, a cache miss occurs. First, this point will be described with reference to FIG. 1 to FIG. 3.

Figure 1:
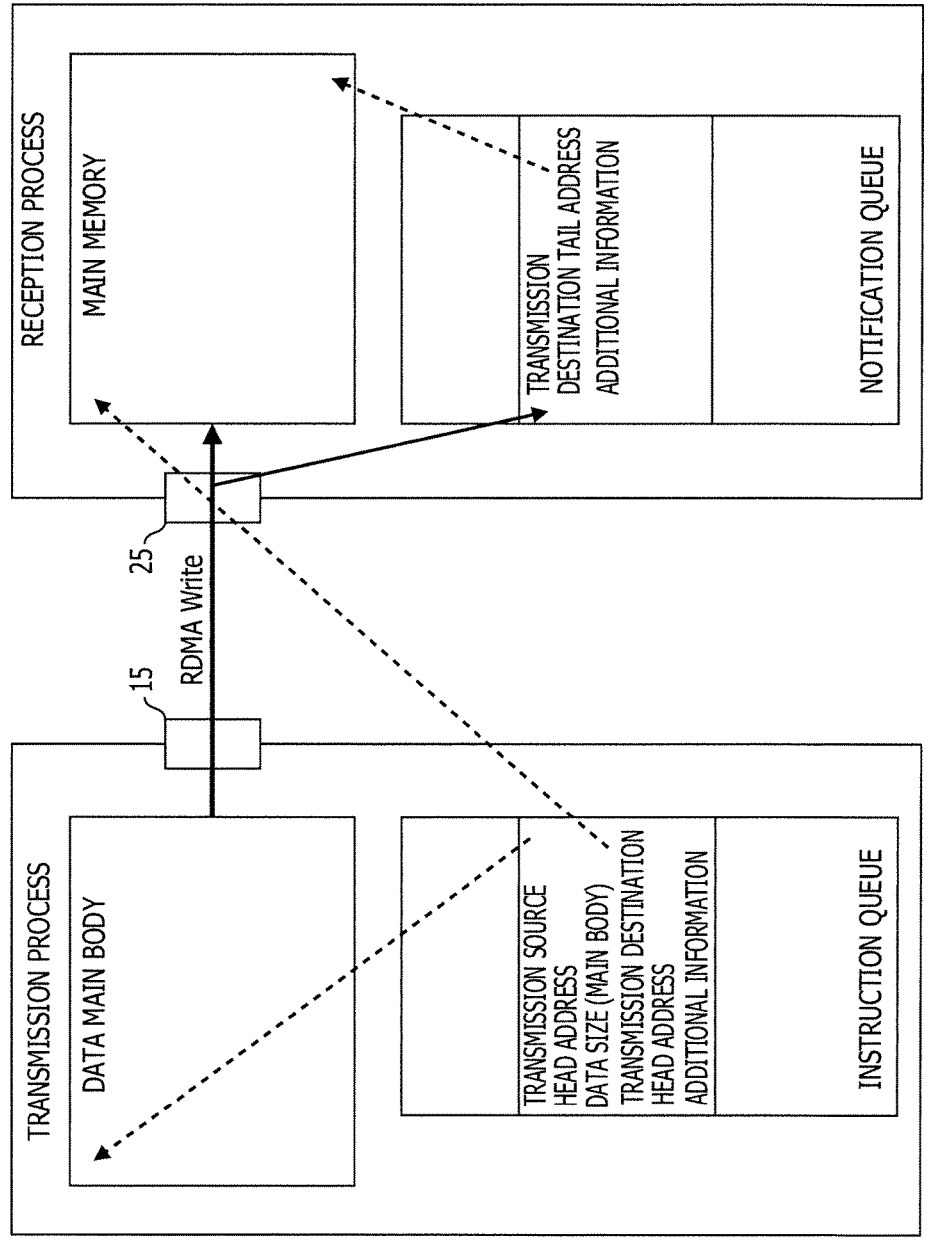
FIG. 1 is a diagram illustrating the occurrence of a cache miss.

In FIG. 1, a transmission process in a node writes data in a main memory to a main memory of another node by RDMA write. When transmitting data, the transmission process writes information about transmission in an instruction queue. Specifically, the transmission process writes a transmission source head address, which is a head address of an area in which data is stored, the size of the data, a transmission destination head address, which is a head address of an area in which transmitted data is stored, and additional information (1 byte or more and 2 bytes or less) for which arbitrary information may be set. When an interconnect 15 is instructed to transmit data by the transmission process, the interconnect 15 transmits the data to a reception process by RDMA in accordance with the information stored in the instruction queue. The information written in the instruction is transmitted as control information with the data.

When an interconnect 25 of the reception process receives data, the interconnect 25 writes the data in the main memory in accordance with the control information. Then, when a write to the main memory is completed, the interconnect 25 writes a transmission destination tail address, which is a tail address of an area in which the data has been written, and the received additional information in a notification queue. When information is written in the notification queue, the reception process starts a read of the data in accordance with the information written in the notification queue.

In this case, if the reception process has information of the size of the data, it is possible to specify the head address, based on the transmission destination tail address and the information of the size of the data. However, if the reception process does not have the information of the size of the data, it is not possible to specify the head address of the data.

Figure 2:
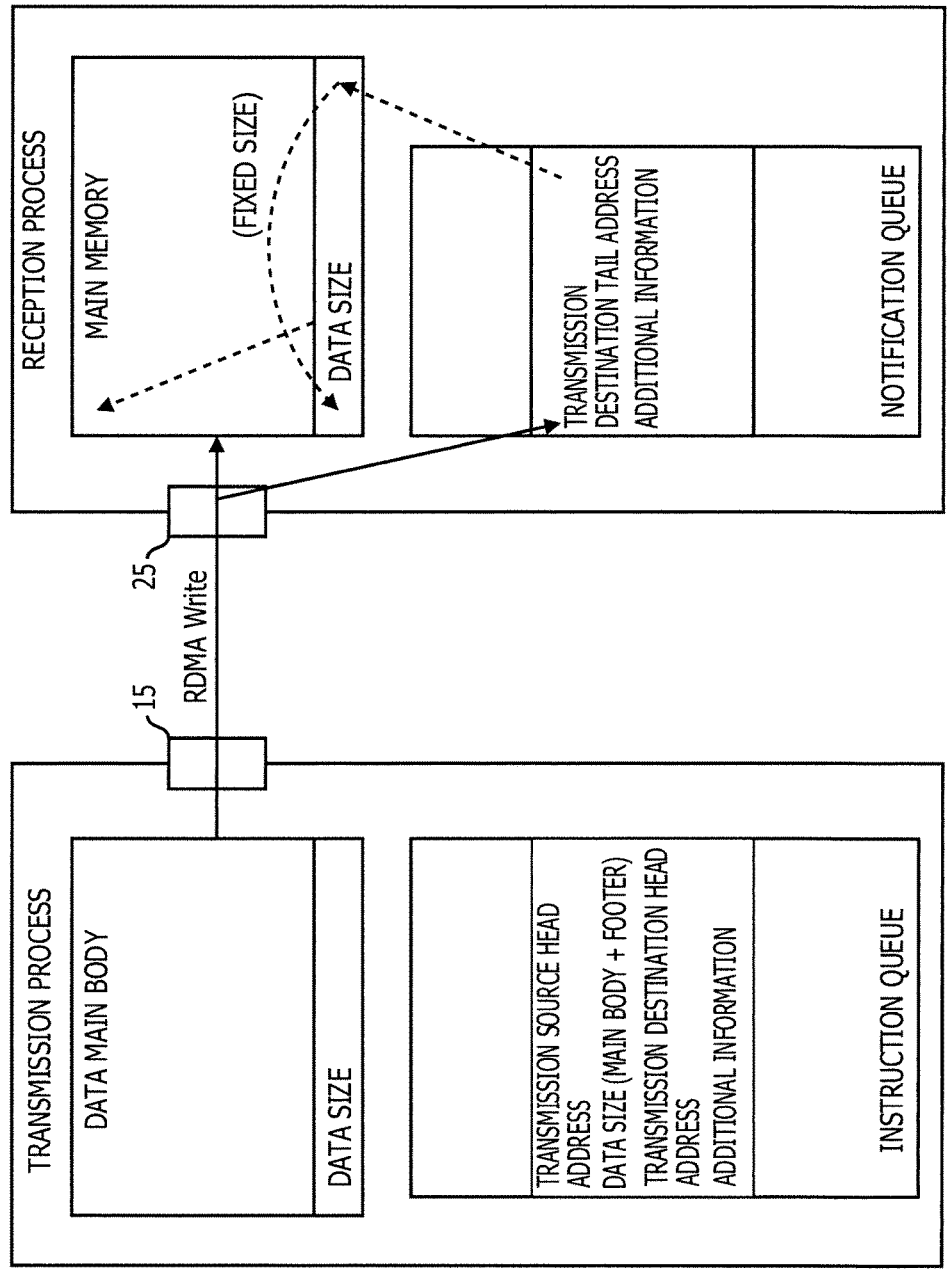
FIG. 2 is a diagram illustrating the occurrence of a cache miss.

Therefore, a method illustrated in FIG. 2 is employed, and thereby, the head address of the data is specified. Specifically, the transmission process adds, to a tail of the data (which will be hereinafter referred to as a "data main body"), a footer including information of the size of the data main body. Then, the interconnect 15 transmits the data main body to which the footer has been added to the reception process.

When the data main body to which the footer has been added is written in the main memory by the interconnect 25, a transmission destination tail address (the address of a tail of the footer in this case) and additional information are written in a notification queue. The reception process calculates the head address of the footer, based on the size of the footer (the size of the footer is fixed) and the transmission destination tail address. Then, the reception process reads out the information of the size of the data main body included in the footer and calculates the head address of the data main body from the size of the data main body.

Figure 3:
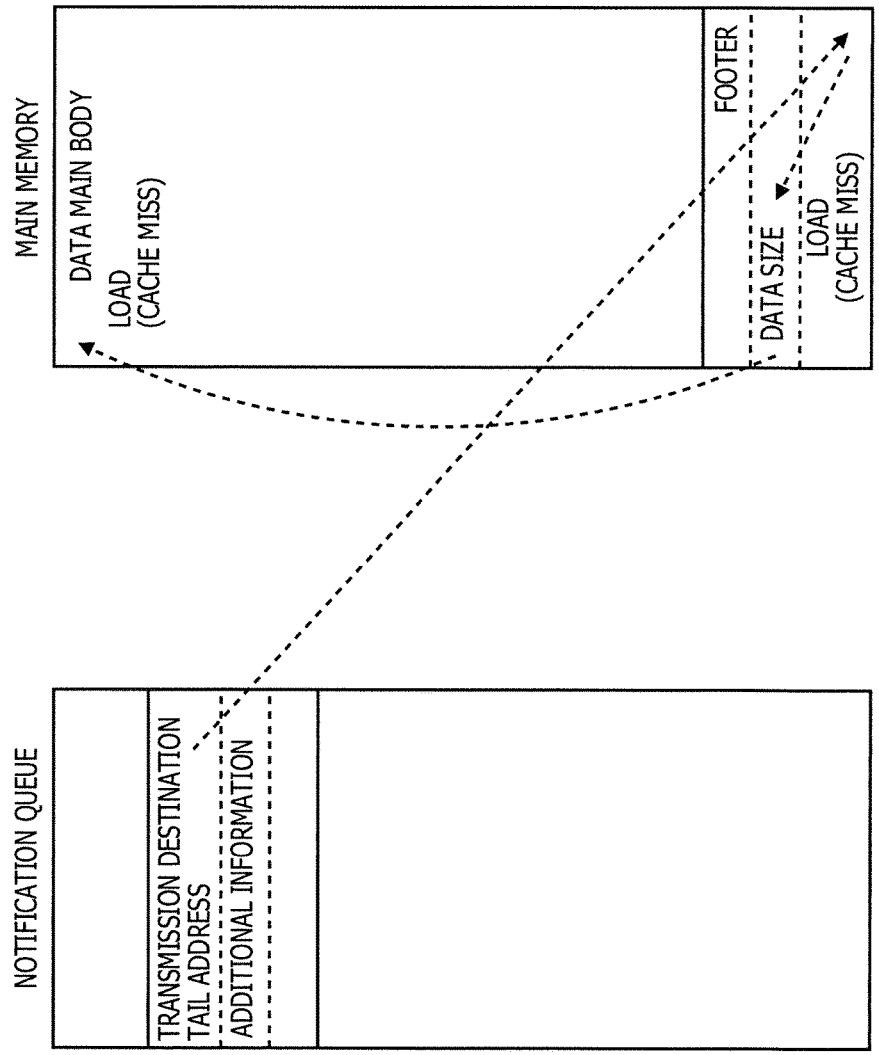
FIG. 3 is a diagram illustrating the occurrence of a cache miss.

However, in a reception side node, if, when the CPU reads the data main body that has been written in the main memory by the interconnect 25, there is not the data main body in a cache memory of the CPU, a cache miss occurs. Therefore, the CPU accesses the main memory, and thus, it takes some time for an access to end. As illustrated in FIG. 3, a cache miss occurs in a read of the footer and a read of the data main body.

As a method for reducing a time for waiting for a memory access that occurs due to a cache miss to end, prefetch has been known. However, in prefetch, it is assumed that a memory address that is accessed is designated. Unless prefetch is started at a timing sufficiently before a timing of a memory access (specifically, a timing ahead of the timing of the memory access by about the same time as the time which it takes to perform a memory access), prefetch is not effective. In an example of FIG. 2, the head address of the data main body is calculated by a read of the footer, and then, a memory access is started. Therefore, it is not possible to perform prefetch until immediately before a memory access. That is, even when prefetch is performed, the prefetch is not effective. Also, when prefetch is immoderately performed, performance is rather reduced. Furthermore, if a communication is performed a plurality of number of times, the size, a memory address, or the like of data that is written in a next communication are not known, and therefore, it is not normally possible to cause the above-described information to be included in the previous communication in advance.

Therefore, in this embodiment, the occurrence of a cache miss is reduced by the following method.

Figure 4:
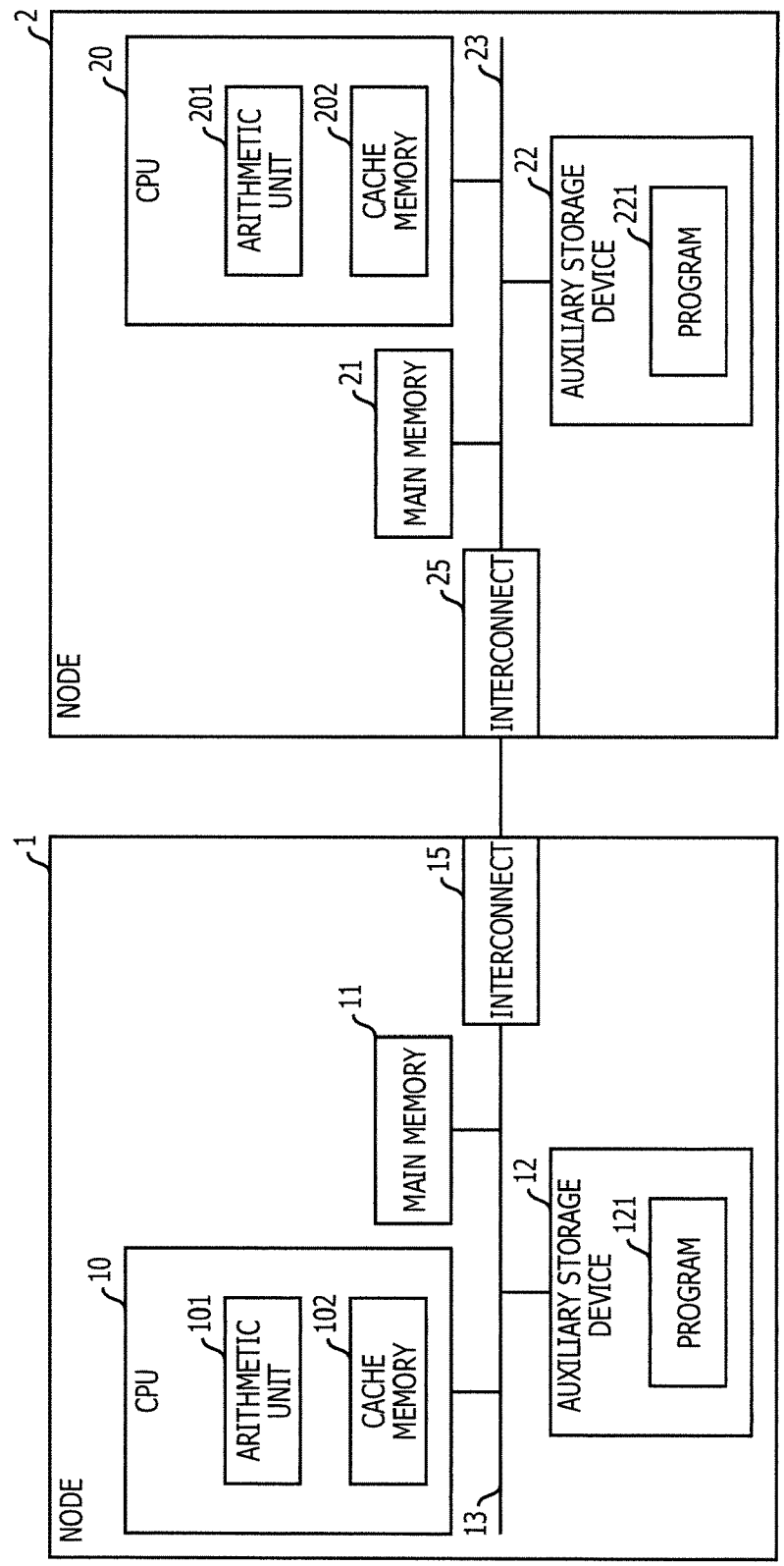
FIG. 4 is a diagram illustrating a system configuration according to an embodiment.

FIG. 4 illustrates a system configuration according to this embodiment. Each of a node 1 and a node 2 is a computer device included in a parallel computing system that executes, for example, high performance computing (HPC). The node 1 and the node 2 are coupled to each other via a communication cable through which data that is used in calculation processing is transmitted or received and are capable of transmitting and receiving data. In FIG. 4, the number of nodes is two, but the number of nodes may be three or more.

The node 1 includes a CPU 10, a main memory 11, an auxiliary storage device 12, a bus 13, and the interconnect 15. The CPU 10 includes an arithmetic unit 101 and a cache memory 102. The main memory 11 is, for example, a random access memory (RAM). The auxiliary storage device 12 is, for example, a hard disk drive (HDD) and stores a program 121 that causes processing according to this embodiment to be executed. The program 121 includes, for example, a program of a message passing interface (MPI) library that is a communication library used by the plurality of nodes in the parallel calculation system or the like for performing a communication. The interconnect 15 is a hardware used for exchanging data with another node.

The node 2 includes a CPU 20, a main memory 21, an auxiliary storage device 22, a bus 23, and the interconnect 25. The CPU 20 includes an arithmetic unit 201 and a cache memory 202. The main memory 21 is a nonvolatile memory, such as, for example, a RAM or the like. The auxiliary storage device 22 is, for example, a HDD and stores a program 221 that causes processing according to this embodiment to be executed. The program 221 includes, for example, a program of a MPI library that is a communication library used by a plurality of nodes in a parallel computing system or the like for performing a communication. The interconnect 25 is a hardware used for exchanging data with another node.

Figure 5:
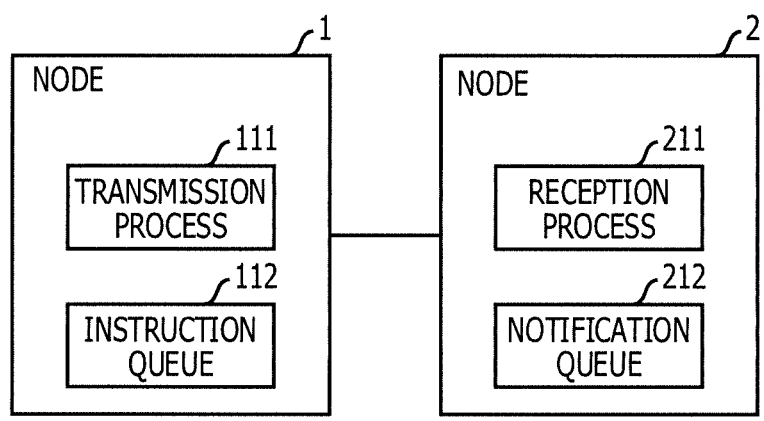
FIG. 5 is a functional block diagram of each node.

The program 121 is loaded to the main memory 11 and is executed by the CPU 10, and thereby, realizes various types of functions. For example, when the node 1 is a transmission node and the node 2 is a reception node, as illustrated in FIG. 5, a transmission process 111 is realized in the node 1. The transmission process 111 executes processing that causes data to be transmitted to another node by RDMA. In the node 1, an instruction queue 112 that is used for instructing a write is realized, for example, on the main memory 11.

The program 221 is loaded to the main memory 21 and is executed by the CPU 20, and thereby, realizes various types of functions. For example, when the node 1 is a transmission node and the node 2 is a reception node, as illustrated in FIG. 5, a reception process 211 is realized in the node 2. The reception process 211 executes processing that causes data to be received from anther node by RDMA. In the node 2, a notification queue 212 that is used for notifying completion of a write is realized, for example, on the main memory 21.

Next, with reference to FIG. 6 to FIG. 12, processing that is executed in a system according to this embodiment will be described. It is assumed below that the node 1 is a transmission node and the node 2 is a reception node.

Figure 6:
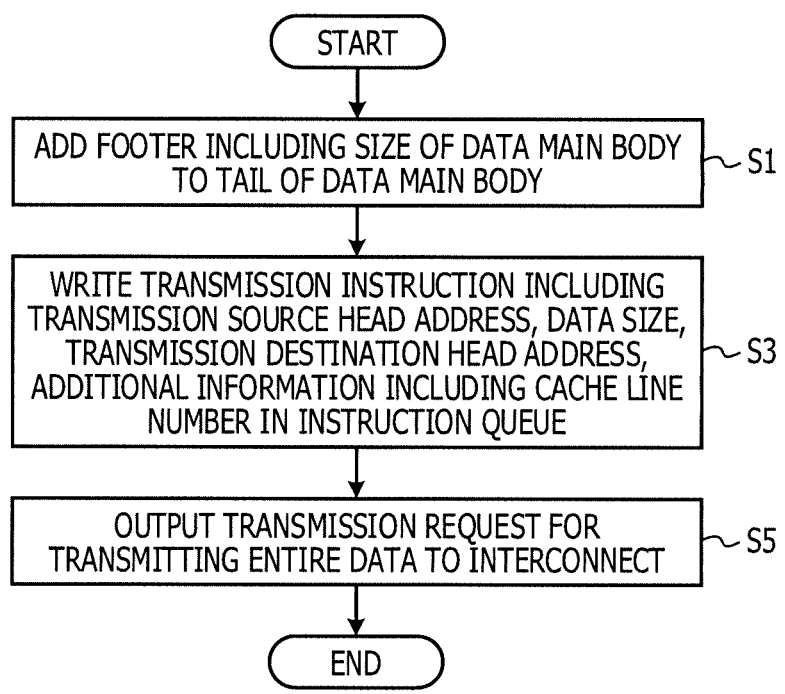
FIG. 6 is a flowchart illustrating a processing flow of processing that is executed by a transmission process of a transmission node.

First, with reference to FIG. 6 and FIG. 7, processing of the transmission process 111 of the node 1 that is a transmission node will be described. The transmission process 111 in the node 1 adds a footer including information of the size of a data main body to a tail of the data main body in the main memory 11 (S1 in FIG. 6). The size of the footer is fixed.

The transmission process 111 calculates information of a cache line number that indicates how many cache lines ahead of a tail address of entire data (including the data main body and the footer) that is stored in the main memory 21 the head address of the entire data is located. Then, the transmission process 111 writes, to the instruction queue 112, a transmission instruction including a transmission source head address, which is the head address of an area in the main memory 11 in which the data main body that is to be transmitted is stored, a data size that is the size of the data main body to which the footer has been added, a transmission destination head address, which is the head address of an area in the main memory 21 in which the data main body is written by RDMA transfer, and additional information including the information of the cache line number (S3).

FIG. 7 illustrates a setting example of the footer and the transmission instruction. In FIG. 7, footer_size represents the size of the footer. cache_line_size represents a cache line size. source_head_addr represents the transmission source head address. data_size represents the size of the entire data. embedded_data represents the additional information. In FIG. 7, "/" represents division in which figures below a decimal point are omitted. The transmission process 111 executes a RDMA write in accordance with the above-described transmission instruction.

On the other hand, the reception process 211 reads out the tail address of the area in which the entire data has been written and the additional information from a completion notification. Then, the reception process 211 executes prefetch on cache lines from an address notice.destination_tail_addr-(notice.embedded_data+1)*cache_line_size to a cache line before notice.destination_tail_addr for every cache_line_size byte. Processing of the reception process 211 will be described in detail later.

The transmission process 111 outputs a transmission request for transmitting the entire data to the interconnect 15 (S5). Then, the processing ends.

Figure 8:
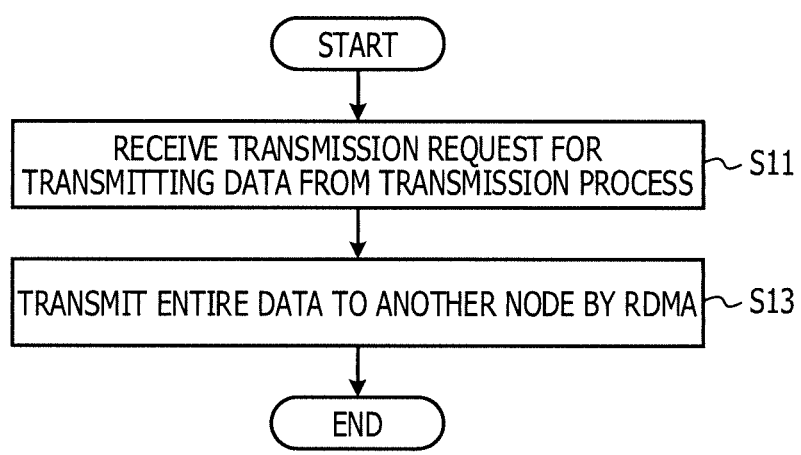
FIG. 8 is a flowchart illustrating a processing flow of processing that is executed by an interconnect of the transmission node.

With reference to FIG. 8, processing that is executed by the interconnect 15 of the node 1 that is a transmission node will be described. The interconnect 15 receives the transmission request for transmitting the entire data from the transmission process 111 (S11 in FIG. 8).

The interconnect 15 transmits the entire data in the main memory 11 to the reception process 211 by RDMA (S13). The control information including information that has been written in the instruction queue 112 is transmitted to the reception process 211 with the data main body. Then, the processing ends.

By executing the above-described processing, even when it is not possible to notify the reception process 211 of the size of the entire data itself because there is an upper limit of the size of the additional information, the reception process 211 is enabled to specify a range in which the head address of the data main body is included, based on the additional information. The information of the cache line number is 2 bytes or less, and therefore, the size of the additional information does not exceed the upper limit.

Figure 9:
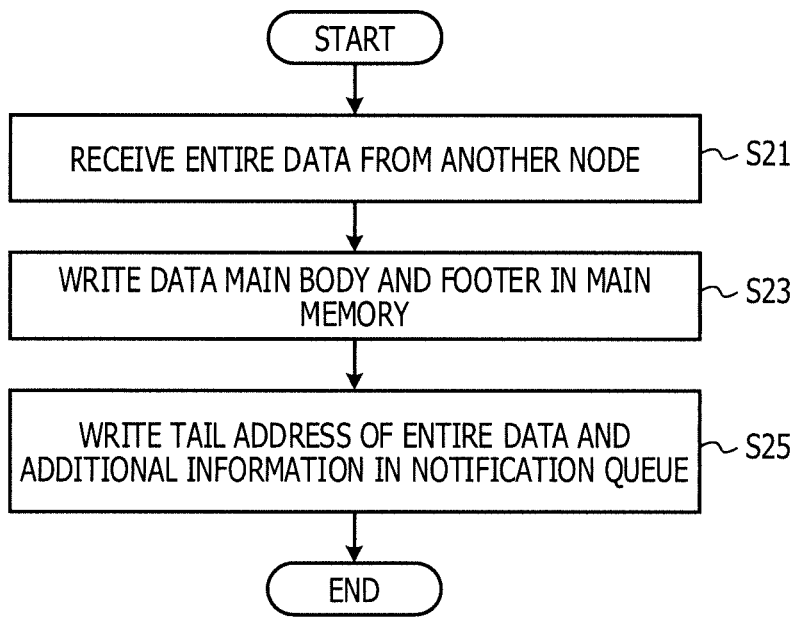
FIG. 9 is a flowchart illustrating a processing flow of processing that is executed by an interconnect of a reception node.

With reference to FIG. 9, processing that is executed by the interconnect 25 of the node 2 that is a reception node will be described. First, the interconnect 25 receives the entire data from the node 1 that is a transmission node (S21 in FIG. 9).

The interconnect 25 writes the received entire data (that is, the data main body and the footer) in the main memory 21 in accordance with the control information (S23).

The interconnect 25 writes the tail address of the entire data and the additional information in the notification queue 212 (S25). Then, the processing ends.

Figure 10:
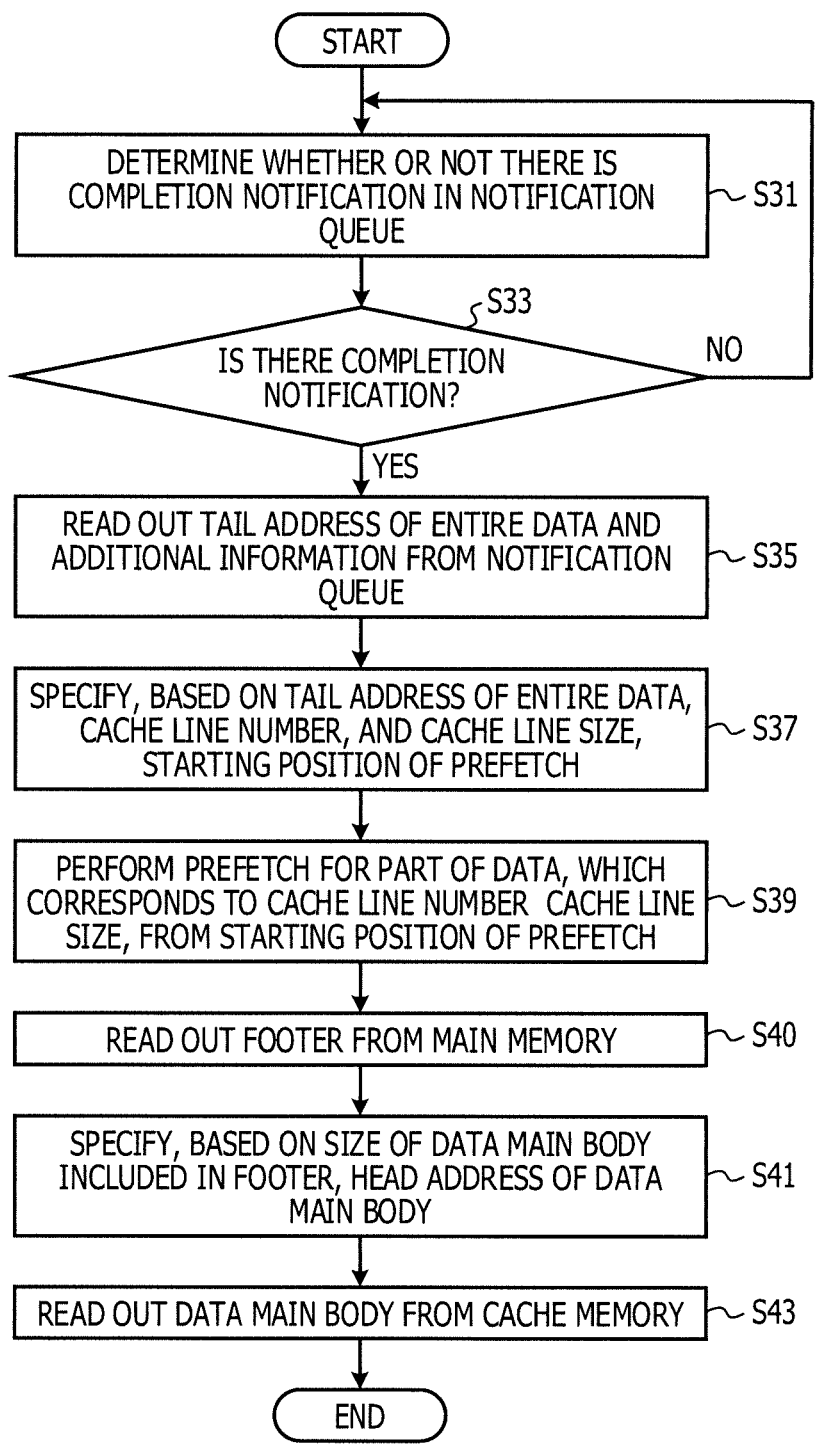
FIG. 10 is a flowchart illustrating a processing flow of processing that is executed by a reception process of the reception node.

With reference to FIG. 10, processing of the reception process 211 of the node 2 that is a reception node will be described. The reception process 211 determines whether or not there is the completion notification in the notification queue 212 (S31 in FIG. 10).

If there is not the completion notification in the notification queue 212 (a NO route in S33), the process returns to the processing of S31. On the other hand, if there is the completion notification in the notification queue 212 (a YES route in S33), the following processing is executed. Specifically, the reception process 211 reads out the tail address of the entire data and the additional information from the notification queue 212 (S35).

The reception process 211 specifies a starting position of prefetch, based on the tail address of the entire data, the cache line number included in the additional information, and the cache line size (S37). In S37, for example, a position located ahead of the tail address of the entire data by a part corresponding to (the cache line number+1)*the cache line size is specified as the starting position of prefetch. However, the starting position may be specified using an address in a predetermined range from the tail address of the entire data, not the tail address of the entire data, as an origin.

The reception process 211 performs, from the starting position that has been specified in S37, prefetch from the main memory 21 to the cache memory 202 for a part corresponding to the cache line number*the cache line size (S39). There is a probability that, when processing of S39 is executed, prefetch is not performed on a part of the data main body. Therefore, the data main body on which prefetch has not been performed is read out from the main memory 21. The footer is not prefetched.

The reception process 211 reads out the footer from the main memory 21 (S40). As described above, the size of the footer is fixed, and therefore, the head address of the footer is specified from the tail address of the entire data and the size of the footer. Accordingly, in S40, a read is performed for a part corresponding to the size of the footer from the specified head address.

The reception process 211 specifies the head address of the data main body, based on the information of the size of the data main body, which is included in the footer that has been read out in S40 (S41). The tail address of the data main body is specified from the head address of the footer, which has been specified in S40. Therefore, the head address of the data main body is specified from the tail address of the data main body and the size of the data main body.

The reception process 211 reads out the data main body from the cache memory 202, based on the head address that has been specified in S41 (S43). Normally, information of an address of the main memory 21 is added to data that is stored in the cache memory 202. Therefore, based on the information, the data maim body is read out from the cache memory 202. However, as described above, there is a case where a part of the data main body does not exist in the cache memory 202, and therefore, in that case, the data main body is read out from the main memory 21. Then, the processing ends.

Figure 11:
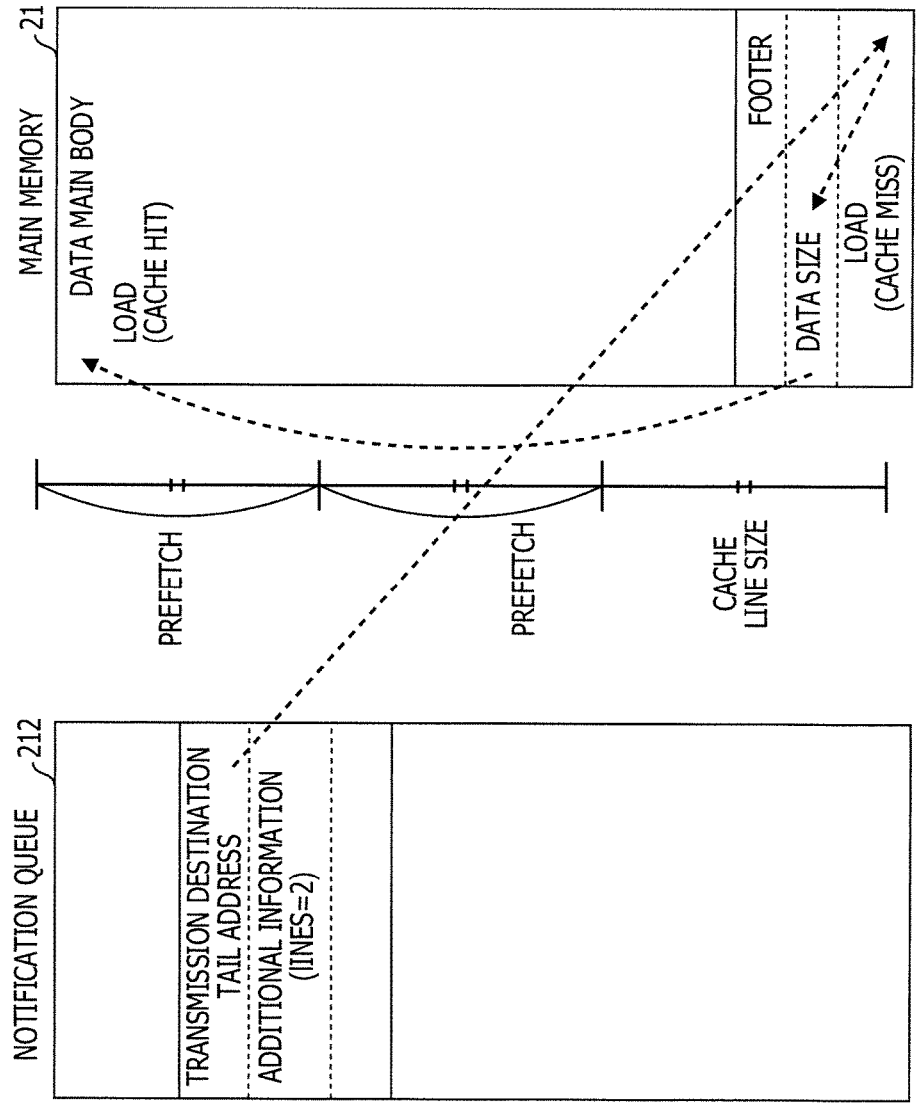
FIG. 11 is a diagram illustrating processing according to the embodiment.

With reference to FIG. 11, additional description of the above-described processing will be given. For example, as illustrated in FIG. 11, when additional information indicating that "the cache line number=2" has been set, prefetch is performed for a memory area corresponding to two cache lines. For a part in which the footer exists, prefetch is not performed. Therefore, for the footer, a cache miss occurs, but a cache miss does not occur in a large part of the data main body.

Figure 12:
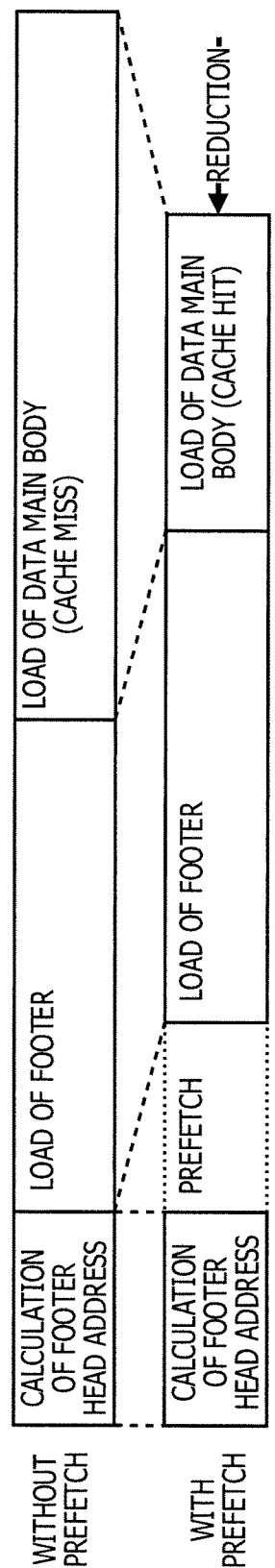
FIG. 12 is a diagram illustrating a comparison between when prefetch is performed and when prefetch is not performed.

Accordingly, by performing prefetch in the manner described in this embodiment, as illustrated in FIG. 12, a time which it takes to load the data main body may be reduced. It also takes some time to perform a calculation of the cache line number, embedding of data in an additional information field, a read of data from the additional information field, and prefetch. However, a time by which the loading time is reduced by reduction of the occurrence of a cache miss is longer, and therefore, as a whole, a processing time is reduced.

An embodiment has been described above, but the present disclosure is not limited thereto. For example, there is a case where the functional block configuration of each of the node 1 and the node 2, which has been described above, does not match an actual program module configuration.

The data configuration described above is merely an example, and there may be a case where the above-described configuration is not employed. Furthermore, in the processing flow, the order of processes may be changed as long as the processing result is not changed. Furthermore, the processes may be executed in parallel.

The size of the additional information field and the size of the entire data themselves may be transmitted as the additional information.

The size of the data main body to which this embodiment is applicable depends on the size of the additional information field. If it is assumed that the cache line size is 128 bytes and the size of the additional information field is 8 bits, this embodiment may be applied to the data main body of up to 32 KiB at largest.

The embodiment described above may be summarizes as follows.

A parallel processing device according to a first aspect of this embodiment includes (A) a first node and (B) a second node. The first node includes (a1) a transmission unit that transmits data and information of the size of the data to the second node by remote direct memory access (RDMA). The second node includes (b1) a reception unit that receives the data and the information of the size of the data from the first node and writes the data in a memory area and (b2) a data processing unit that performs prefetch of at least a part of the data, based on information of a position in which the data has been written by the reception unit and the information of the size of the data.

Thus, at least a part of the data is prefetched in advance before reading the data from the memory area, and therefore, the occurrence of a cache miss may be reduced. By using information of the cache line number, the amount of information may be reduced, as compared to a case where information of the data size (the unit of which is, for example, byte) is used.

The information of the size of the data may include the information of the cache line number. The information of the position in which the data has been written may include the tail address of the memory area in which the data has been written.

The data processing unit may be configured to (b21) specify, based on a size that has been calculated by multiplying a cache line size by a number obtained by adding a predetermined number to the cache line number and the tail address of the memory area in which the data has been written, a starting position of the prefetch, and (b22) read out, from the starting position of the prefetch, a part of the data, which corresponds to a size that has been calculated by multiplying the cache line number by the cache line size. Thus, it is enabled to properly prefetch the data.

The data may include a data main body and information of the size of the data main body. The data processing unit may be configured to (b3) specify, based on the information of the size of the data main body and a head address of a footer, which has been calculated from the size of the footer and a tail address of the memory area in which the data has been written and (b4) read out, based on the specified head address of the data main body, the data main body from a cache. If the data is read out from the cache, the memory area is not accessed, and therefore, a time up to a time when processing of data may be started may be reduced.

The information of the position in which the data is written may include information of a head address of a memory area in which the data is written. Thus, the second node is enabled to write the data in the memory area.

The memory area may be an area of a main memory.

Each of the first node and the second node may be an information processing device.

A transmission program according to a second aspect of this embodiment includes a process including (C) reading out data stored in a storage device and (D) transmitting the readout data and information of the size of the data to another computer by remote direct memory access (RDMA).

A reception program according to a third aspect of this embodiment includes a process including (E) receiving data and information of the size of the data from another computer and writing the data in a memory area, and (F) performing prefetch of at least a part of the data, based on information of a position in which the data has been written and the information of the size of the data.

A program that causes a processor to execute a process by the above-described method may be generated. The program is stored in, for example, a computer-readable recording medium or a storage device, such as a flexible disk, a CD-ROM, a magneto-optic disk, a semiconductor memory, a hard disk, or the like. An intermediate processing result is temporarily retained in a storage device, such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data transfer method executed by a parallel processing system including a first node and a second node, the data transfer method comprising:
    transmitting, by a first processor included in the first node, data and information of a size of the data to a second processor included in the second node by remote direct memory access (RDMA);
    receiving, by the second processor, the data and the information of the size of the data from the first processor;
    writing the received data in a memory; and
    performing prefetch of at least a part of the data, based on information of a position of a memory area of the memory in which the received data has been written and the information of the size of the data,
    wherein the information of the position includes information of a tail address of the memory area.

2. The data transfer method according to claim 1, wherein
    the information of the size of the data includes information of a cache line number, which indicates how many cache lines ahead of a tail address of the received data a head address of the received data is located, and
    the information of the position includes a tail address of the memory area in which the data has been written.

3. The data transfer method according to claim 2,
wherein the performing the prefetch includes:
specifying a starting position of the prefetch, based on a size that has been calculated by multiplying a cache line size by a number obtained by adding a predetermined number to the cache line number and the tail address of the memory area in which the data has been written, and
reading out, from the starting position of the prefetch, a part of the data, which corresponds to a size that has been calculated by multiplying the cache line number by the cache line size.

4. The data transfer method according to claim 1, wherein the data includes a data main body and information of the size of the data main body, and
the performing the prefetch includes:
specifying a head address of the data main body, based on the information of the size of the data main body and a head address of a footer, which has been calculated from a size of the footer and a tail address of the memory area in which the data has been written, and
reading out the data main body from a cache memory based on the specified head address.

5. The data transfer method according to claim 4,
wherein the transmitting includes adding the information of the size to a tail of the data main body.

6. A parallel processing system, comprising:
a first node including a first processor; and
a second node including a second processor,
wherein the first processor is configured to
transmit data and information of a size of the data to the second processor by remote direct memory access (RDMA), and
wherein the second processor is configured to:
receive the data and the information of the size of the data from the first processor,
write the received data in a memory, and
perform prefetch of at least a part of the data, based on information of a position of a memory area of the memory in which the received data has been written and the information of the size of the data,
wherein the information of the position includes information of a tail address of the memory area.

7. A non-transitory computer-readable recording medium storing a program that causes a processor included in a node included in a parallel processing system to execute a process, the process comprising:
receiving data and information of a size of the data from another node included in the parallel processing system by remote direct memory access (RDMA);
writing the data in a memory; and
performing prefetch of at least a part of the data, based on information of a position of a memory area of the memory in which the received data has been written and the information of the size of the data,
wherein the information of the position includes information of a tail address of the memory area.

8. The recording medium according to claim 7, wherein the information of the size of the data includes information of a cache line number, which indicates how many cache lines ahead of a tail address of the received data a head address of the received data is located, and
the information of the position includes a tail address of the memory area in which the data has been written.

9. The recording medium according to claim 8,
wherein the performing the prefetch includes:
specifying a starting position of the prefetch, based on a size that has been calculated by multiplying a cache line size by a number obtained by adding a predetermined number to the cache line number and the tail address of the memory area in which the data has been written, and
reading out, from the starting position of the prefetch, a part of the data, which corresponds to a size that has been calculated by multiplying the cache line number by the cache line size.

10. The recording medium according to claim 7, wherein the data includes a data main body and information of the size of the data main body, and
the performing the prefetch includes:
specifying a head address of the data main body, based on the information of the size of the data main body and a head address of a footer, which has been calculated from the size of the footer and a tail address of the memory area in which the data has been written, and
reading out the data main body from a cache memory based on the specified head address.

11. The recording medium according to claim 10,
wherein the transmitting includes adding the information of the size to a tail of the data main body.

* * * * *